US011096234B2

(12) United States Patent
Girish et al.

(10) Patent No.: US 11,096,234 B2
(45) Date of Patent: Aug. 17, 2021

(54) ESTABLISHING MEDIA DEVICE CONTROL BASED ON WIRELESS DEVICE PROXIMITY

(71) Applicant: ARRIS Enterprises LLC, Suwanee, GA (US)

(72) Inventors: Praveen Girish, Bangalore (IN); Bradley Thomas Howard, Suwanee, GA (US); Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 280 days.

(21) Appl. No.: 15/290,659

(22) Filed: Oct. 11, 2016

(65) Prior Publication Data

US 2018/0103080 A1  Apr. 12, 2018

(51) Int. Cl.
H04W 4/02 (2018.01)
H04L 29/06 (2006.01)
G06Q 30/02 (2012.01)
H04W 8/00 (2009.01)
H04N 21/442 (2011.01)
H04N 21/488 (2011.01)
H04N 21/81 (2011.01)
H04W 68/00 (2009.01)
(Continued)

(52) U.S. Cl.
CPC ........ H04W 76/20 (2018.02); G06Q 30/0269 (2013.01); H04L 65/80 (2013.01); H04M 1/72415 (2021.01); H04N 21/44218 (2013.01); H04N 21/4882 (2013.01); H04N 21/812 (2013.01); H04W 68/005 (2013.01); H04M 1/72412 (2021.01); H04M 1/72457 (2021.01)

(58) Field of Classification Search
CPC ....... H04W 4/80; H04W 4/023; H04W 8/005; H04W 4/008; H04W 76/20; H04W 68/005; H04L 65/604; G06Q 30/0269; H04M 1/72533; H04M 1/7253; H04M 1/72572; H04N 21/44218; H04N 21/4882; H04N 21/812
See application file for complete search history.

(56) References Cited

U.S. PATENT DOCUMENTS

2005/0203905 A1* 9/2005 Jung ................. G06F 16/27
2006/0161872 A1* 7/2006 Rytivaara .......... H04M 1/72439
715/864
(Continued)

Primary Examiner — Philip J Chea
Assistant Examiner — Hassan A Khan
(74) Attorney, Agent, or Firm — Wenderoth, Lind & Ponack, L.L.P.

(57) ABSTRACT

Methods, systems, and computer readable media can be operable to facilitate the control of a media device based upon the proximity of a wireless device. A viewable area may be mapped for one or more media devices within a premise, wherein the map of the viewable area for a media device includes one or more wireless quality parameters observed by a wireless device while the wireless device is located within an area around the media device from which a user may view content output from the media device. Based upon a comparison between wireless quality parameters currently observed by a wireless device and wireless quality parameters of a viewable area map, a determination may be made that the wireless device is within the viewable area of a media device, and the wireless device may be configured as a control device for the media device.

17 Claims, 11 Drawing Sheets

(51) Int. Cl.
*H04W 76/20* (2018.01)
*H04M 1/72415* (2021.01)
*H04M 1/72412* (2021.01)
*H04M 1/72457* (2021.01)

(56) References Cited

U.S. PATENT DOCUMENTS

| | | | | |
|---|---|---|---|---|
| 2007/0140187 A1* | 6/2007 | Rokusek | ............... | H04L 67/12 |
| | | | | 370/338 |
| 2007/0143857 A1* | 6/2007 | Ansari | ............ | H04N 21/25833 |
| | | | | 726/26 |
| 2008/0081558 A1* | 4/2008 | Dunko | ................ | G11B 27/002 |
| | | | | 455/41.1 |
| 2009/0138507 A1* | 5/2009 | Burckart | ............. | G11B 27/105 |
| 2009/0248913 A1* | 10/2009 | Salokannel | ....... | H04M 1/72412 |
| | | | | 710/33 |
| 2011/0072078 A1* | 3/2011 | Chai | ..................... | G06F 16/489 |
| | | | | 709/203 |
| 2011/0131332 A1* | 6/2011 | Bouazizi | ............ | H04L 65/1016 |
| | | | | 709/227 |
| 2013/0045680 A1* | 2/2013 | Dua | ..................... | H04W 76/14 |
| | | | | 455/41.1 |
| 2013/0331031 A1* | 12/2013 | Palin | ................... | H04W 8/005 |
| | | | | 455/41.2 |
| 2014/0273859 A1* | 9/2014 | Luna | ..................... | H04W 4/80 |
| | | | | 455/41.3 |
| 2014/0361903 A1 | 12/2014 | Sawada | | |
| 2014/0370818 A1 | 12/2014 | Luna | | |
| 2018/0232976 A1* | 8/2018 | Schoenfelder | .......... | G07C 9/28 |

* cited by examiner

ESTABLISHING MEDIA DEVICE CONTROL BASED ON WIRELESS DEVICE PROXIMITY

TECHNICAL FIELD

This disclosure relates to the establishing of media device control based on wireless device proximity.

BACKGROUND

With the advent of wireless devices such as tablets and smart phones within a subscriber premise, multimedia content is provided to a plurality of different subscriber devices. These wireless devices are typically communicating with one or more access points or gateway devices within the subscriber premise to enhance the user experience. Wireless devices may be connected to a local area network through one of a plurality of access points situated throughout a premise, and one or more of these access points may be embedded within a media device such as a set-top box (STB).

It is common for a user to interact with one or more wireless devices while viewing content output by a media device. For example, a user might receive an incoming call, text message, or electronic mail message while viewing a program that is output from a media device. In some cases, the user might desire to immediately answer the incoming call or respond to the incoming message, but in order to do so without being distracted from the program that is being viewed, the user typically must first find a control device (e.g., remote control unit (RCU)) and pause the program. This scenario can cause a user to miss the incoming call or message or to miss a portion of the program being viewed.

Further, a media device may be configured to push targeted content to a wireless device or to identify a specific viewer of the media device in order to place content relevant to the specific viewer into a piece of content output from the media device. However, multiple wireless devices associated with different viewers are typically found within a premise, and there are currently no mechanisms for the media device to determine which wireless device should control the identification of targeted content.

Therefore, it is desirable to improve upon methods and systems for identifying a media device that is to be controlled by a wireless device.

BRIEF DESCRIPTION OF THE DRAWINGS

Like reference numbers and designations in the various drawings indicate like elements.

DETAILED DESCRIPTION

Figure 1:
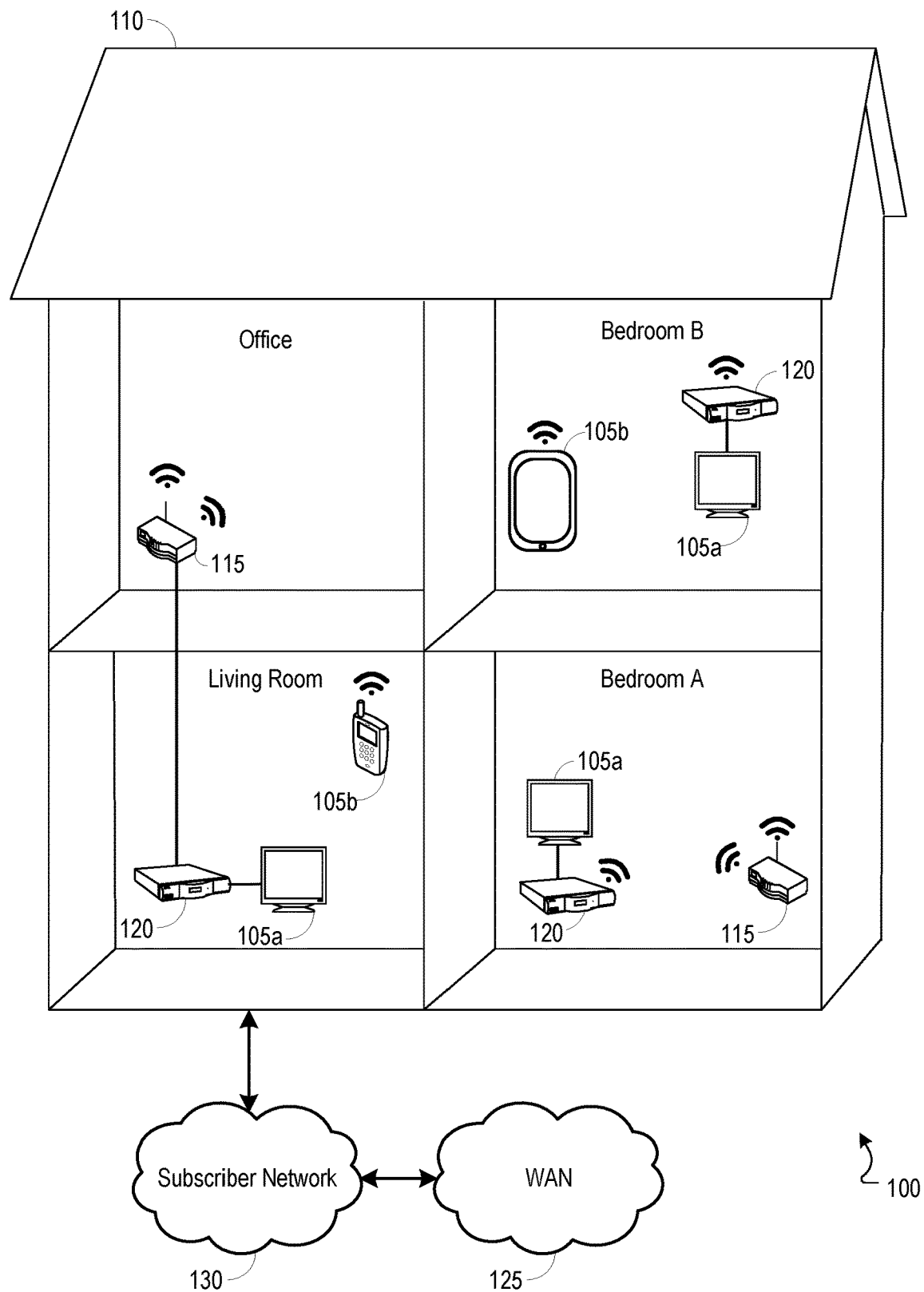
FIG. 1 is a block diagram illustrating an example network environment operable to facilitate the control of a media device based upon the proximity of a wireless device.

It is desirable to improve upon methods and systems for identifying a media device to be controlled by a wireless device. Methods, systems, and computer readable media can be operable to facilitate the control of a media device based upon the proximity of a wireless device. A viewable area may be mapped for one or more media devices within a premise, wherein the map of the viewable area for a media device includes one or more wireless quality parameters observed by a wireless device while the wireless device is located within an area around the media device from which a user may view content output from the media device. Based upon a comparison between wireless quality parameters currently observed by a wireless device and wireless quality parameters of a viewable area map, a determination may be made that the wireless device is within the viewable area of a media device, and the wireless device may be configured as a control device for the media device.

An embodiment of the invention described herein may include a method comprising: (a) establishing a connection between a wireless device and an access point; (b) retrieving one or more proximity profiles for each media device of one or more media devices, wherein the proximity profile for each respective one media device of the one or more media devices comprises one or more wireless quality parameters; (c) retrieving one or more wireless quality parameters associated with the connection between the wireless device and the access point; (d) identifying at least one wireless quality parameter of a proximity profile for a media device of the one or more media devices, wherein the identified at least one wireless quality parameter matches at least one of the wireless quality parameters associated with the connection between the wireless device and the access point; and (e) configuring the wireless device as a control device for the media device identified as having at least one wireless quality parameter that matches at least one wireless quality parameter associated with the connection between the wireless device and the access point.

According to an embodiment of the invention, the method described herein may further comprise: (a) receiving a notification at the media device for which the wireless device is configured as a control device, the notification recognizing a communication received by the wireless device; (b) pausing playback of content at the media device;

and (c) resuming playback of the content at the media device in response to a notification that the communication has terminated.

According to an embodiment of the invention, the method described herein may further comprise: (a) receiving a notification at the media device for which the wireless device is configured as a control device, the notification including a message received by the wireless device; (b) generating a user interface that includes the message and a prompt for user input of a response to the message; (c) outputting the user interface to a display; (d) receiving user input of a response to the message; and (e) outputting the response.

According to an embodiment of the invention, the method described herein may further comprise: (a) retrieving, at the media device for which the wireless device is configured as a control device, a piece of content that is associated with a program being output by the media device to a display; and (b) outputting the retrieved piece of content to the wireless device.

According to an embodiment of the invention, the method described herein may further comprise: (a) retrieving, at the media device for which the wireless device is configured as a control device, user-interest information from the wireless device; (b) identifying a targeted advertisement that is associated with the retrieved user-information; and (c) outputting the targeted advertisement to a display by inserting the targeted advertisement into a program that is being output to the display.

According to an embodiment of the invention, the one or more proximity profiles are retrieved from storage at the wireless device.

According to an embodiment of the invention, the one or more proximity profiles are retrieved from storage at the access point.

According to an embodiment of the invention, the proximity profile for each respective one media device of the one or more media devices is generated by taking a plurality of wireless quality measurements associated with the wireless connection between a wireless device and an access point while the wireless device is within an area around the respective one media device from which content output by the media device may be viewed at a display associated with the respective one media device.

An embodiment of the invention described herein may include an apparatus comprising one or more modules configured to: (a) when a connection between a wireless device and an access point is established, retrieve one or more proximity profiles for each media device of one or more media devices, wherein the proximity profile for each respective one media device of the one or more media devices comprises one or more wireless quality parameters; (b) retrieve one or more wireless quality parameters associated with the connection between the wireless device and the access point; (c) identify at least one wireless quality parameter of a proximity profile for a media device, wherein the at least one wireless quality parameter of the proximity profile matches at least one of the wireless quality parameters associated with the connection between the wireless device and the access point; and (d) configure the wireless device as a control device for the media device identified as having at least one wireless quality parameter that matches at least one wireless quality parameter associated with the connection between the wireless device and the access point.

According to an embodiment of the invention, the one or more modules are further configured to: (a) receive a notification recognizing a communication received by the wireless device; (b) pause playback of content; and (c) resume playback of the content in response to a notification that the communication has terminated.

According to an embodiment of the invention, the one or more modules are further configured to: (a) receive a notification that includes a message that has been received by the wireless device; (b) generate a user interface that includes the message and a prompt for user input of a response to the message; (c) output the user interface to a display; (d) receive user input of a response to the message; and (e) output the response.

According to an embodiment of the invention, the one or more modules are further configured to: (a) retrieve a piece of content that is associated with a program being output to a display; and (b) output the retrieved piece of content to the wireless device.

According to an embodiment of the invention, the one or more modules are further configured to: (a) retrieve user-interest information from the wireless device; (b) identify a targeted advertisement that is associated with the retrieved user-information; and (c) output the targeted advertisement to a display by inserting the targeted advertisement into a program that is being output to the display.

An embodiment of the invention described herein may include one or more non-transitory computer readable media having instructions operable to cause one or more processors to perform the operations comprising: (a) establishing a connection between a wireless device and an access point; (b) retrieving one or more proximity profiles for each media device of one or more media devices, wherein the proximity profile for each respective one media device of the one or more media devices comprises one or more wireless quality parameters; (c) retrieving one or more wireless quality parameters associated with the connection between the wireless device and the access point; (d) identifying at least one wireless quality parameter of a proximity profile for a media device, wherein the at least one wireless quality parameter of the proximity profile matches at least one of the wireless quality parameters associated with the connection between the wireless device and the access point; and (e) configuring the wireless device as a control device for the media device identified as having at least one wireless quality parameter that matches at least one wireless quality parameter associated with the connection between the wireless device and the access point.

According to an embodiment of the invention, the instructions are further operable to cause one or more processors to perform the operations comprising: (a) receiving a notification at the media device for which the wireless device is configured as a control device, the notification recognizing a communication received by the wireless device; (b) pausing playback of content at the media device; and (c) resuming playback of the content at the media device in response to a notification that the communication has terminated.

According to an embodiment of the invention, the instructions are further operable to cause one or more processors to perform the operations comprising: (a) receiving a notification at the media device for which the wireless device is configured as a control device, the notification including a message received by the wireless device; (b) generating a user interface that includes the message and a prompt for user input of a response to the message; (c) outputting the user interface to a display; (d) receiving user input of a response to the message; and (e) outputting the response.

According to an embodiment of the invention, the instructions are further operable to cause one or more processors to perform the operations comprising: (a) retrieving, at the media device for which the wireless device is configured as a control device, a piece of content that is associated with a program being output by the media device to a display; and (b) outputting the retrieved piece of content to the wireless device.

According to an embodiment of the invention, the instructions are further operable to cause one or more processors to perform the operations comprising: (a) retrieving, at the media device for which the wireless device is configured as a control device, user-interest information from the wireless device; (b) identifying a targeted advertisement that is associated with the retrieved user-information; and (c) outputting the targeted advertisement to a display by inserting the targeted advertisement into a program that is being output to the display.

FIG. 1 is a block diagram illustrating an example network environment 100 operable to facilitate the control of a media device based upon the proximity of a wireless device. In embodiments, video, voice, and/or data services may be delivered to one or more client devices 105. Client devices 105 may include a television 105a, mobile wireless device 105b (e.g., mobile telephone, tablet, etc.), computer, gaming console, wearable device (e.g., smart watch, glasses, etc.) and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, and others.

Multiple services may be delivered to client devices 105 within a subscriber premise 110 over one or more local networks (e.g., coaxial network, a local area network (LAN), wireless local area network (WLAN), personal area network (PAN), Multimedia over Coax Alliance (MoCA) network, mobile hotspot network, and any other interconnectivity operable to route communications to and from client devices 105), and delivery of the multiple services may be facilitated by one or more access devices. Access devices may include any device configured to receive and/or deliver communications or services to one or more client devices 105. For example, access devices may include an access point 115 (e.g., gateway device, router, wireless extender, etc.), a set-top box (STB) 120, and others. It should be understood that one or more access devices may be integrated with each other or with other devices. For example, a client device 105 or STB 120 may operate as a station or an access point.

It should be understood that delivery of the multiple services over the local network(s) may be accomplished using a variety of standards and formats. It will be appreciated by those skilled in the relevant art that client devices 105 may be capable of interacting and communicating with each other and/or with a central device or access device over various wired and wireless communication standards (e.g., HTTP (hypertext transfer protocol), Wi-Fi, Bluetooth, etc.).

Multiple services may be provided to a subscriber premise 110 from a WAN 125 through a subscriber network 130. The subscriber network 130 may include, for example, a hybrid fiber-coaxial (HFC) network, fiber network, mobile network, and any other network operable to deliver services to a subscriber premise 110.

In embodiments, a wireless device (e.g., mobile device 105b) may be associated with a media device (e.g., STB 120) as a control device. For example, an application or module at the wireless device may allow a user to communicate with the media device and to control playback of media at the media device. The wireless device may be associated with a media device as a control device when the determination is made that the wireless device is located within a viewable area associated with the media device. The viewable area of a media device may be an area around the media device from which it is possible to view content output to a display device associated with the media device. A wireless device may be configured to generate a map of a viewable area for a media device, wherein the map is generated based upon a set of wireless quality parameters retrieved by the wireless device. For example, when a wireless device is connected to an access point (e.g., access point embedded within a media device or stand-alone access point such as an access point 115), a media device for mapping may be identified, and the wireless device may begin to record observed wireless quality parameters associated with the connection between the wireless device and the access point. The wireless quality parameters may include the strength of the signal received at the wireless device from the access point (e.g., signal power level as indicated by a RSSI (received signal strength indicator) or other indicator), a current data rate at which communications are received at the wireless device from the access point, and others. A user may move the wireless device throughout an area around the media device while the wireless device records observed wireless quality parameters, and the wireless quality parameters may be recorded as a proximity profile that designates wireless quality parameters that are expected to be observed by a device that is within the viewable area of the media device.

In embodiments, when a wireless device (e.g., mobile device 105b) is associated with or connected to an access point of a media device (e.g., STB 120) or standalone access point 115, the wireless device may retrieve one or more wireless quality parameters of a proximity profile (e.g., group of parameters that indicate a position within a viewable area associated with a media device) associated with one or more media devices and may compare the retrieved wireless quality parameter(s) to one or more wireless quality parameters currently observed by the wireless device. For example, the wireless device may be configured to periodically retrieve current wireless quality parameters associated with a connection between the wireless device and an access point, and the wireless device may compare the current parameters to one or more wireless quality parameters associated with one or more proximity profiles that are associated with one or more media devices. If one or more of the current wireless quality parameters match one or more wireless quality parameters associated with a proximity profile, the wireless device may be configured as a control device for a media device that is associated with the proximity profile.

When a wireless device is configured as a control device for a media device, a user interface presented at the wireless device may allow a user to control various functions at the media device (e.g., setup functions, playback functions, audio/video functions, trickplay functions, etc.). In embodiments, when a wireless device is configured as a control device (e.g., when the wireless device is within the viewable area associated with the media device) for a media device, playback of content from the media device may be controlled based upon actions or events occurring at the wireless device. For example, the media device may autonomously pause playback or may provide a user with an option to pause playback of content at the media device when an incoming call or message is received or is answered by a user through the wireless device, and the media device may autonomously resume or may provide a user with an option to resume playback of the content from the pause point when the incoming call has terminated or the incoming message has been responded to. As another example, the media device may display a message that is received at the wireless device and may provide a user with an option for responding to the received message through the media device.

In embodiments, when a wireless device is configured as a control device for a media device, the media device may identify and may push contextual or targeted content (e.g., advertisement content, instructional content, cooperative content, etc.) to the wireless device. For example, the media device may retrieve the contextual or targeted content from an upstream server, may receive the content along with a program that is currently being output to a display, or may retrieve the content from storage internal to the media device.

In embodiments, when a wireless device is configured as a control device for a media device, the media device may pull user-interest information from the wireless device and may identify and retrieve targeted content based upon the user-interest information. User-interest information pulled from the wireless device may include, for example, personal information associated with the user (e.g., name, gender, age, etc.), preferences associated with the user (e.g., favorite channels, shows, media genres, etc.), an identification of content previously viewed by the user, and/or other information that may be used to select appropriate targeted advertisement content that might be relevant to the user. Using the user-information, the media device may identify targeted advertisement(s) that are best suited for the user of the wireless device. For example, the media device, or an upstream server (e.g., targeted advertisement server) may identify and retrieve advertisement content that has one or more parameters matching one or more parameters of the retrieved user-information, and the advertisement content may be placed within a program (e.g., at an advertisement splicing point) that is being output from the media device to a display.

Figure 2:
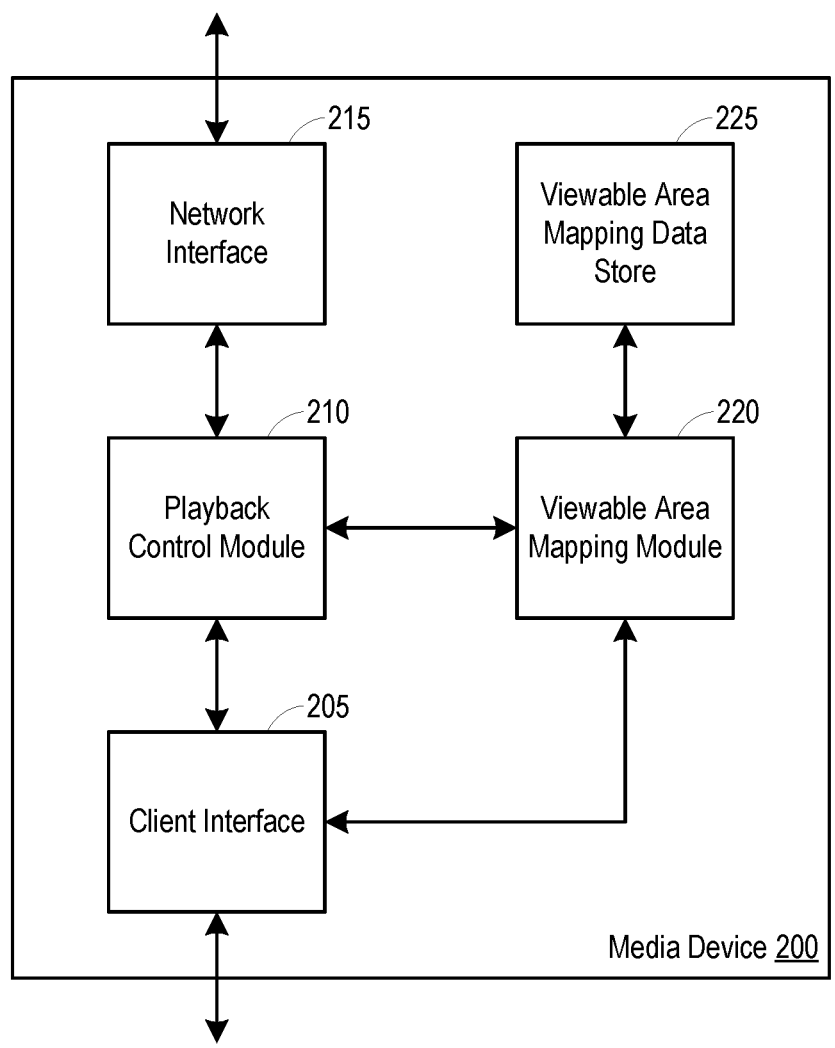
FIG. 2 is a block diagram illustrating an example media device operable to facilitate the control of a media device based upon the proximity of a wireless device.

FIG. 2 is a block diagram illustrating an example media device 200 operable to facilitate the control of a media device based upon the proximity of a wireless device. The media device 200 may include a client interface 205, a playback control module 210, a network interface 215, a viewable area mapping module 220, and a viewable area mapping data store 225. It should be understood that the media device may include an embedded access point 115 of FIG. 1 or may be otherwise associated with an access point 115. The media device 200 may be a gateway device or STB 120 of FIG. 1 or other type of device configured to deliver one or more services to a client device.

In embodiments, a client interface 205 may provide an interface for facilitating communications between the media device 200 and one or more client devices (e.g., STB 120 of FIG. 1, television 105a of FIG. 1, mobile device 105b of FIG. 1, etc.). For example, multiple services may be output from the media device 200 through the client interface 205 and may be delivered to one or more client devices over a local network (e.g., LAN, WLAN, MoCA, etc.). It should be understood that a client interface 205 may be configured to receive and/or output communications using various communication techniques, protocols, and standards (e.g., Ethernet, Wi-Fi, Multimedia over Coax Alliance (MoCA), twisted pair, etc.). Wireless communications may be transmitted to and received from one or more client devices through the client interface 205. The media device 200 may receive one or more services from an upstream WAN or access point 115 through the network interface 215, and the media device 200 may provide the one or more services to a client device through the client interface 205.

In embodiments, the client interface 205 may include one or more antennas for transmitting and receiving wireless communications. The client interface 205 may include a multiple input/multiple output (MIMO) antenna configuration (e.g., 2×2, 3×3, 4×4, etc.) or a single input/single output (SISO) antenna configuration (e.g., 1×1).

In embodiments, the media device 200 may be configured to associate a wireless device (e.g., mobile device 105b) with a media device (e.g., STB 120) as a control device. For example, a viewable area mapping module 220 may allow a user to communicate with the media device and to control playback of media at the media device. The wireless device may be associated with a media device as a control device when the viewable area mapping module 220 determines that the wireless device is located within a viewable area associated with the media device. A map of a viewable area for a media device may be generated and stored at the viewable area mapping data store 225. The map of the viewable area may be generated by a wireless device and received by the viewable area mapping module 220 through the client interface 205, wherein the map is generated based upon a set of wireless quality parameters retrieved by the wireless device. The map of the viewable area may be stored within the viewable area mapping data store 225 as a proximity profile associated with the media device. For example, the proximity profile for a media device may include one or more wireless quality parameters associated with a wireless connection between a wireless device and an access point. The wireless quality parameters may include the strength of the signal received at the wireless device from the access point (e.g., RSSI (received signal strength indicator)), a current data rate at which communications are received at the wireless device from the access point, and others.

In embodiments, when a wireless device is associated with or connected to an access point of the media device 200 or standalone access point 115, the wireless device may retrieve one or more wireless quality parameters of a proximity profile (e.g., group of parameters that indicate a position within a viewable area associated with a media device) associated with one or more media devices and may compare the retrieved wireless quality parameter(s) to one or more wireless quality parameters currently observed by the wireless device. For example, the wireless device may be configured to periodically retrieve current wireless quality parameters associated with a connection between the wireless device and an access point, and the wireless device may compare the current parameters to one or more wireless quality parameters associated with one or more proximity profiles that are associated with one or more media devices. If one or more of the current wireless quality parameters match one or more wireless quality parameters associated with a proximity profile, the viewable area mapping module 220 may recognize the wireless device as a control device. It should be understood that the viewable area mapping module 220 may determine that the current wireless quality parameter(s) match one or more of the retrieved quality parameters if the current wireless quality parameter(s) is/are within a certain threshold range of one or more of the retrieved quality parameters.

When a wireless device is configured as a control device for the media device 200, a user interface presented at the wireless device may allow a user to control various functions at the media device 200 (e.g., setup functions, playback functions, audio/video functions, trickplay functions, etc.).

In embodiments, when a wireless device is configured as a control device (e.g., when the wireless device is within the viewable area associated with the media device 200) for a media device, playback of content from the media device may be controlled based upon actions or events occurring at the wireless device. For example, the viewable area mapping module 220 may detect an incoming call or message received at the wireless device and, in response, may cause the playback control module 210 to pause playback of content being output to a display or may output a user interface to a display that provides a user with an option to pause playback of content at the media device. The viewable area mapping module 220 may recognize when the incoming call has been terminated or when the incoming message has been responded to, and in response, the viewable area mapping module may cause the playback control module 210 to resume playback of the content or may output a user interface to a display that provides a user with an option to resume playback of the content from the pause point. As another example, the viewable area mapping module 220 may output a display of a message that is received at the wireless device and may provide a user with an option for responding to the received message.

In embodiments, when a wireless device is configured as a control device for a media device 200, the viewable area mapping module 220 may identify and may push contextual or targeted content (e.g., advertisement content, instructional content, cooperative content, etc.) to the wireless device. For example, the viewable area mapping module 220 may retrieve the contextual or targeted content from an upstream server, may receive the content along with a program that is currently being output to a display through the client interface 205, or may retrieve the content from storage internal to the media device 200.

In embodiments, when a wireless device is configured as a control device for a media device 200, the viewable area mapping module 220 may pull user-interest information from the wireless device and may identify and retrieve targeted content based upon the user-interest information. Using the user-information, the viewable area mapping module 220 may identify targeted advertisement(s) that are best suited for the user of the wireless device. For example, the viewable area mapping module 220 may output the user-information to an upstream server (e.g., targeted advertisement server) or may identify and retrieve advertisement content that has one or more parameters matching one or more parameters of the retrieved user-information, and the advertisement content may be placed within a program (e.g., at an advertisement splicing point) that is being output from the media device 200 to a display.

Figure 3:
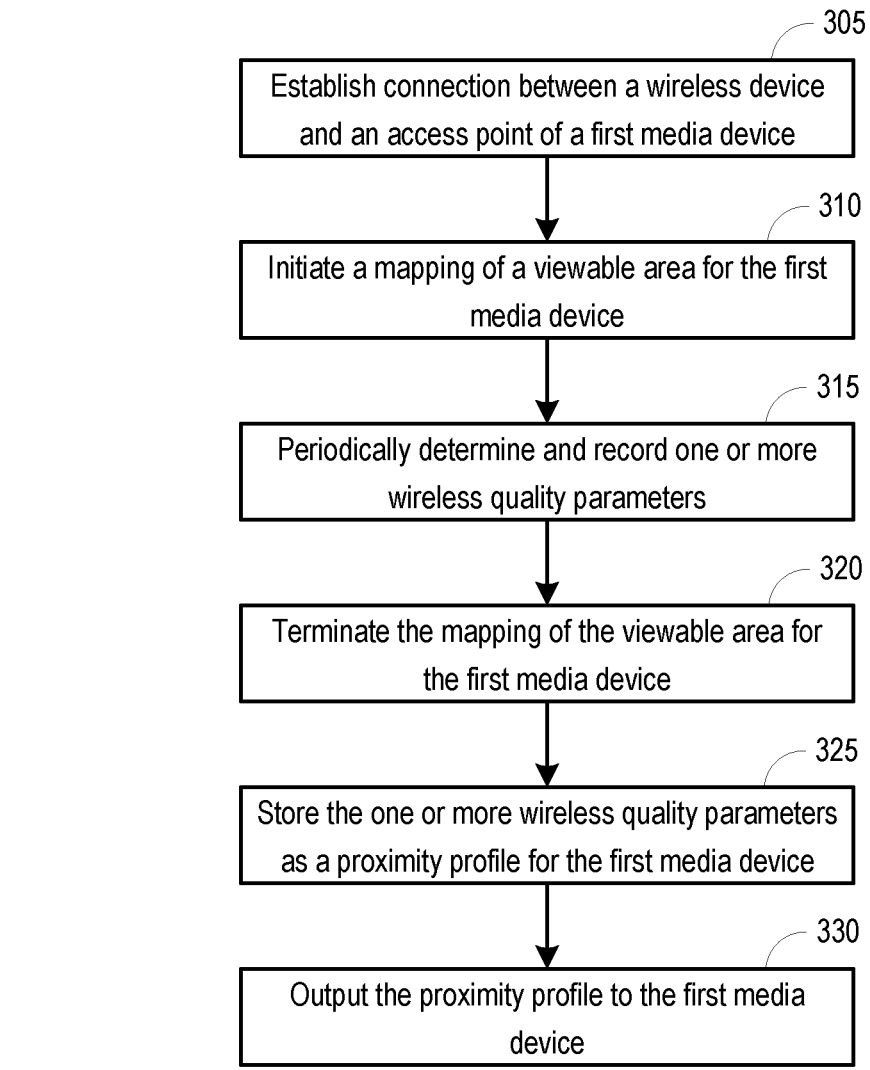
FIG. 3 is a flowchart illustrating an example process operable to facilitate the mapping of a viewable area for a media device.

FIG. 3 is a flowchart illustrating an example process 300 operable to facilitate the mapping of a viewable area for a media device. The process 300 may begin at 305, when a connection between a wireless device and an access point of a first media device is established. The wireless device (e.g., mobile device 105b of FIG. 1) may associate/pair with an access point of the first media device through a client interface 205 of FIG. 2. In embodiments, the first media device may be a gateway or STB device (e.g., STB 120 of FIG. 1) with an embedded or associated access point (e.g., access point 115 of FIG. 1). It should be understood that the connection between the wireless device and the access point of the first media device may be an initial association/pairing or a subsequent association/pairing and that the connection may be established according to various known communication exchange methods and protocols.

At 310, a mapping of a viewable area for the first media device may be initiated. The mapping of the viewable area may be initiated, for example, by an application or module at the wireless device.

At 315, one or more wireless quality parameters may be periodically determined and recorded. For example, once the mapping of the viewable area for the first media device is initiated, the wireless device may retrieve or determine and record one or more wireless quality parameters that are associated with the quality of the connection between the wireless device and the access point of the first media device. The wireless quality parameters may include, for example, the strength of the signal received at the wireless device from the access point (e.g., RSSI (received signal strength indicator)), a current data rate at which communications are received at the wireless device from the access point, and others. The wireless device may monitor and may periodically (e.g., at 1, 2, 5 second intervals, etc.) capture and store the wireless quality parameters. For example, the wireless quality parameters may be retrieved by the wireless device from a hardware abstraction layer (HAL) of a WLAN (Wi-Fi) chip.

While the mapping of the viewable area for the first media device is active and the wireless quality parameters are periodically determined and recorded, the wireless device may be moved throughout a viewable area associated with the first media device. For example, the viewable area of the first media device may be the area around the first media device from which a user may view displayed content that is output from the first media device to a display device. The user may carry the wireless device throughout the viewable area, and the wireless device may periodically record each measured wireless quality parameter as a parameter associated with an area from which content output by the first media device may be viewed.

At 320, the mapping of the viewable area for the first media device may be terminated. When the mapping of the viewable area is terminated, the wireless device may cease the determining and recording of the one or more wireless quality parameters. In embodiments, the wireless device and/or the first media device may be configured with a timer associated with the viewable area mapping. The timer may be initiated with the initiation of the viewable area mapping, and the periodic determination and recording of the one or more wireless quality parameters may be ceased when the timer expires. In embodiments, a user may select an option via the wireless device to terminate the mapping of the viewable area for the first media device when the user has finished carrying the wireless device throughout the viewable area associated with the first media device. As another embodiment, the mapping of the viewable area may be terminated when a sufficient or predetermined number of wireless quality parameters have been recorded.

At 325, the one or more wireless quality parameters may be stored as a proximity profile for the first media device. For example, the one or more wireless quality parameters may be stored as a proximity profile for the first media device at the wireless device. In embodiments, the one or more wireless quality parameters may be stored within a proximity profile for the first media device as parameters that indicate a wireless device's presence within the viewable area of the first media device.

At 330, the proximity profile may be output to the first media device. For example, the wireless device may output the proximity profile including the associated one or more wireless quality parameters to the first media device. The first media device may store the proximity profile and may associate the proximity profile with the wireless device.

Figure 4:
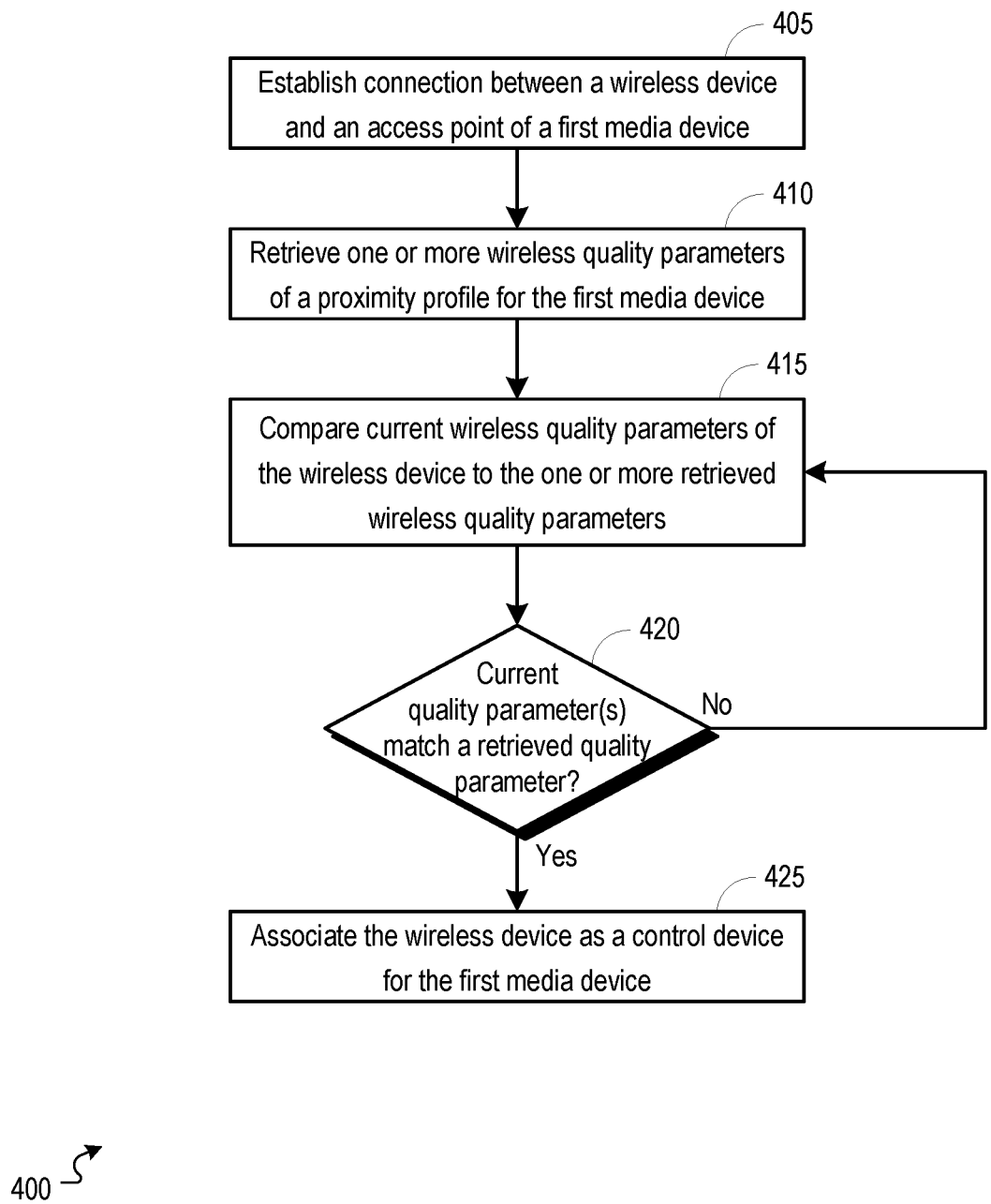
FIG. 4 is a flowchart illustrating an example process operable to facilitate media device control switching based upon a mapping of a viewable area for a media device.

FIG. 4 is a flowchart illustrating an example process 400 operable to facilitate media device control switching based upon a mapping of a viewable area for a media device. The process 400 may begin at 405, when a connection between a wireless device and an access point of a first media device is established. The wireless device (e.g., mobile device 105b of FIG. 1) may associate/pair with an access point of the first media device through a client interface 205 of FIG. 2. In embodiments, the first media device may be a gateway or STB device (e.g., STB 120 of FIG. 1) with an embedded or associated access point (e.g., access point 115 of FIG. 1). It should be understood that the connection between the wireless device and the access point of the first media device may be an initial association/pairing or a subsequent association/pairing and that the connection may be established according to various known communication exchange methods and protocols.

At 410, one or more wireless quality parameters of a proximity profile for the first media device may be retrieved. For example, the wireless quality parameters of the proximity profile may be retrieved by the wireless device from storage at the wireless device or may be retrieved by the wireless device from the access point of the first media device. The one or more wireless quality parameters may be parameters that were experienced by a wireless device while the wireless device was within an area identified as an area within which a user may view a display associated with the first media device. The wireless quality parameters may include, for example, the strength of the signal received at the wireless device from the access point (e.g., RSSI (received signal strength indicator)), a data rate at which communications are received at the wireless device from the access point, and/or other parameters experienced by the wireless device while the wireless device was within the viewable area of the first media device.

At 415, current wireless quality parameters of the wireless device may be compared to the one or more retrieved wireless quality parameters. For example, the wireless device or the access point of the first media device (e.g., the viewable area mapping module 220 of FIG. 2) may determine or retrieve one or more current wireless quality parameters. The current wireless quality parameters may be wireless quality parameters associated with the connection between the wireless device and the access point of the first media device. For example, the wireless quality parameters may be retrieved from a hardware abstraction layer (HAL) of a WLAN (Wi-Fi) chip.

At 420, a determination may be made whether the current wireless quality parameter(s) match one or more of the retrieved quality parameters of the proximity profile for the first media device. The determination whether the current wireless quality parameter(s) match one or more of the retrieved quality parameters may be made, for example, by the wireless device or by the access point of the first media device (e.g., the viewable area mapping module 220 of FIG. 2). In embodiments, the wireless device or the viewable area mapping module 220 may determine that the current wireless quality parameter(s) match one or more of the retrieved quality parameters if the current wireless quality parameter(s) is/are within a certain threshold range of one or more of the retrieved quality parameters. If the determination is made that the current wireless quality parameter(s) do not match one or more of the retrieved wireless quality parameters of the proximity profile for the first media device, the process 400 may return to 415 where current wireless quality parameters of the wireless device may be retrieved and compared to the one or more retrieved wireless quality parameters. It should be understood that following a determination that the current wireless quality parameter(s) do not match one or more of the retrieved wireless quality parameters of the proximity profile for the first media device, the wireless device and/or access point of the first media device may be configured to delay a subsequent retrieval of current wireless quality parameters for a predetermined duration of time.

If, at 420, the determination is made that the current wireless quality parameter(s) match one or more of the retrieved wireless quality parameters of the proximity profile for the first media device, the process 400 may proceed to 425. At 425, the wireless device may be associated as a control device for the first media device. In embodiments, the wireless device may recognize the first media device as a controlled device, and the first media device may recognize the wireless device as a controlling device. For example, an exchange of communications (e.g., handshake communications) may be passed between the wireless device and the first media device, wherein the communications establish the wireless device as a control device for the first media device. With the wireless device established as a control device for the first media device, the first media device may respond to the occurrence of various events occurring at the wireless device and/or may provide various services to the wireless device.

Figure 5:
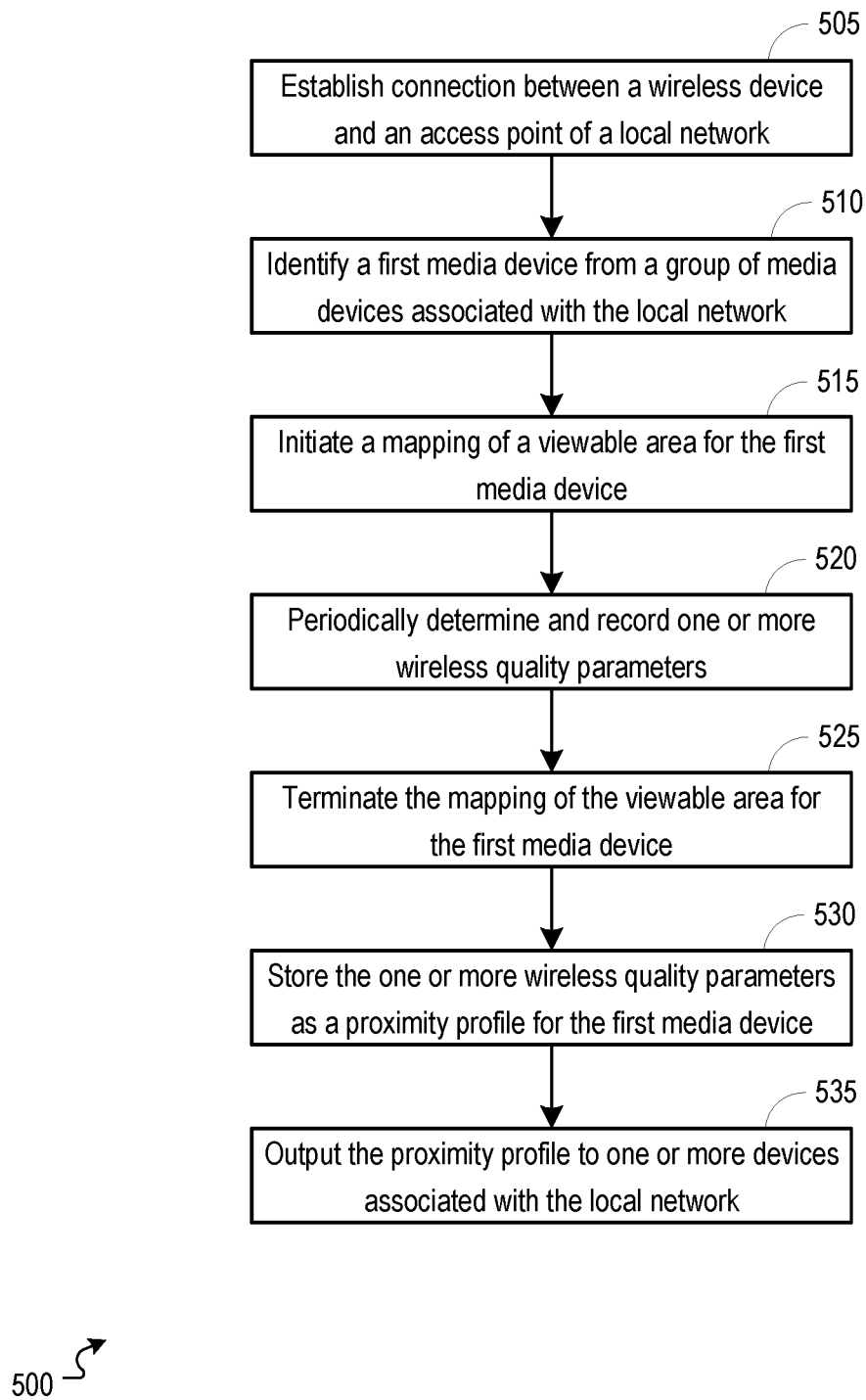
FIG. 5 is a flowchart illustrating an example process operable to facilitate the mapping of a viewable area for one or more media devices of a plurality of media devices.

FIG. 5 is a flowchart illustrating an example process 500 operable to facilitate the mapping of a viewable area for one or more media devices of a plurality of media devices. The process 500 may begin at 505, when a connection between a wireless device and an access point (e.g., access point 115 of FIG. 1) of a local network is established. The wireless device (e.g., mobile device 105b of FIG. 1) may associate/pair with an access point through a client interface 205 of FIG. 2. The access point may be configured to communicate with the wireless device as well as one or more other devices (e.g., other wireless devices, client devices 105 of FIG. 1, STB 120 of FIG. 1, etc.). It should be understood that the connection between the wireless device and the access point of the local network may be an initial association/pairing or a subsequent association/pairing and that the connection may be established according to various known communication exchange methods and protocols.

At 510, a first media device may be identified from a group of media devices associated with the local network. The first media device may be a gateway or STB device (e.g., STB 120 of FIG. 1) with an embedded or associated access point (e.g., access point 115 of FIG. 1) or may be a gateway, STB, or display device that is otherwise associated with or connected to the access point to which the wireless device is connected. In embodiments, a user may identify the first media device through a user interface presented to the user at the wireless device or at a display associated with the first media device. For example, a user interface may present identifiers for each of the media devices within the group of media devices, and the user may select the media device for which a map of a viewable area is to be generated. The first media device may be identified based upon a user's proximity to one or more access points and a known proximity of the first media device to the one or more access points, and the proximities may be determined by capturing and analyzing one or more wireless signal quality parameters. It should be understood that various other techniques may be used to identify the first media device.

At 515, a mapping of a viewable area for the first media device may be initiated. The mapping of the viewable area may be initiated, for example, by an application or module at the wireless device.

At 520, one or more wireless quality parameters may be periodically determined and recorded. For example, once the mapping of the viewable area for the first media device is initiated, the wireless device may retrieve or determine and record one or more wireless quality parameters that are associated with the quality of the connection between the wireless device and the access point of the first media device. The wireless quality parameters may include, for example, the strength of the signal received at the wireless device from the access point (e.g., RSSI (received signal strength indicator)), a current data rate at which communications are received at the wireless device from the access point, and others. The wireless device may monitor and may periodically (e.g., at 1, 2, 5 second intervals, etc.) capture and store the wireless quality parameters. For example, the wireless quality parameters may be retrieved by the wireless device from a hardware abstraction layer (HAL) of a WLAN (Wi-Fi) chip.

While the mapping of the viewable area for the first media device is active and the wireless quality parameters are periodically determined and recorded, the wireless device may be moved throughout a viewable area associated with the first media device. For example, the viewable area of the first media device may be the area around the first media device from which a user may view displayed content that is output from the first media device to a display device. The user may carry the wireless device throughout the viewable area, and the wireless device may periodically record each measured wireless quality parameter as a parameter associated with an area from which content output by the first media device may be viewed.

At 525, the mapping of the viewable area for the first media device may be terminated. When the mapping of the viewable area is terminated, the wireless device may cease the determining and recording of the one or more wireless quality parameters. In embodiments, the wireless device and/or the first media device may be configured with a timer associated with the viewable area mapping. The timer may be initiated with the initiation of the viewable area mapping, and the periodic determination and recording of the one or more wireless quality parameters may be ceased when the timer expires. In embodiments, a user may select an option via the wireless device to terminate the mapping of the viewable area for the first media device when the user has finished carrying the wireless device throughout the viewable area associated with the first media device. As another embodiment, the mapping of the viewable area may be terminated when a sufficient or predetermined number of wireless quality parameters have been recorded.

At 530, the one or more wireless quality parameters may be stored as a proximity profile for the first media device. For example, the one or more wireless quality parameters may be stored as a proximity profile for the first media device at the wireless device. In embodiments, the one or more wireless quality parameters may be stored within a proximity profile for the first media device as parameters that indicate a wireless device's presence within the viewable area of the first media device.

At 535, the proximity profile may be output to one or more devices associated with the local network. For example, the wireless device may output the proximity profile including the associated one or more wireless quality parameters to the access point to which the wireless device is connected, to the first media device, and/or to any other device connected to the local network. In embodiments, after the access point receives the proximity profile from the wireless device, the access point may distribute the proximity profile to one or more devices connected to the local network, including the first media device. The access point and/or first media device may use the proximity profile to determine whether a wireless device is within the viewable area of the first media device.

Figure 6:
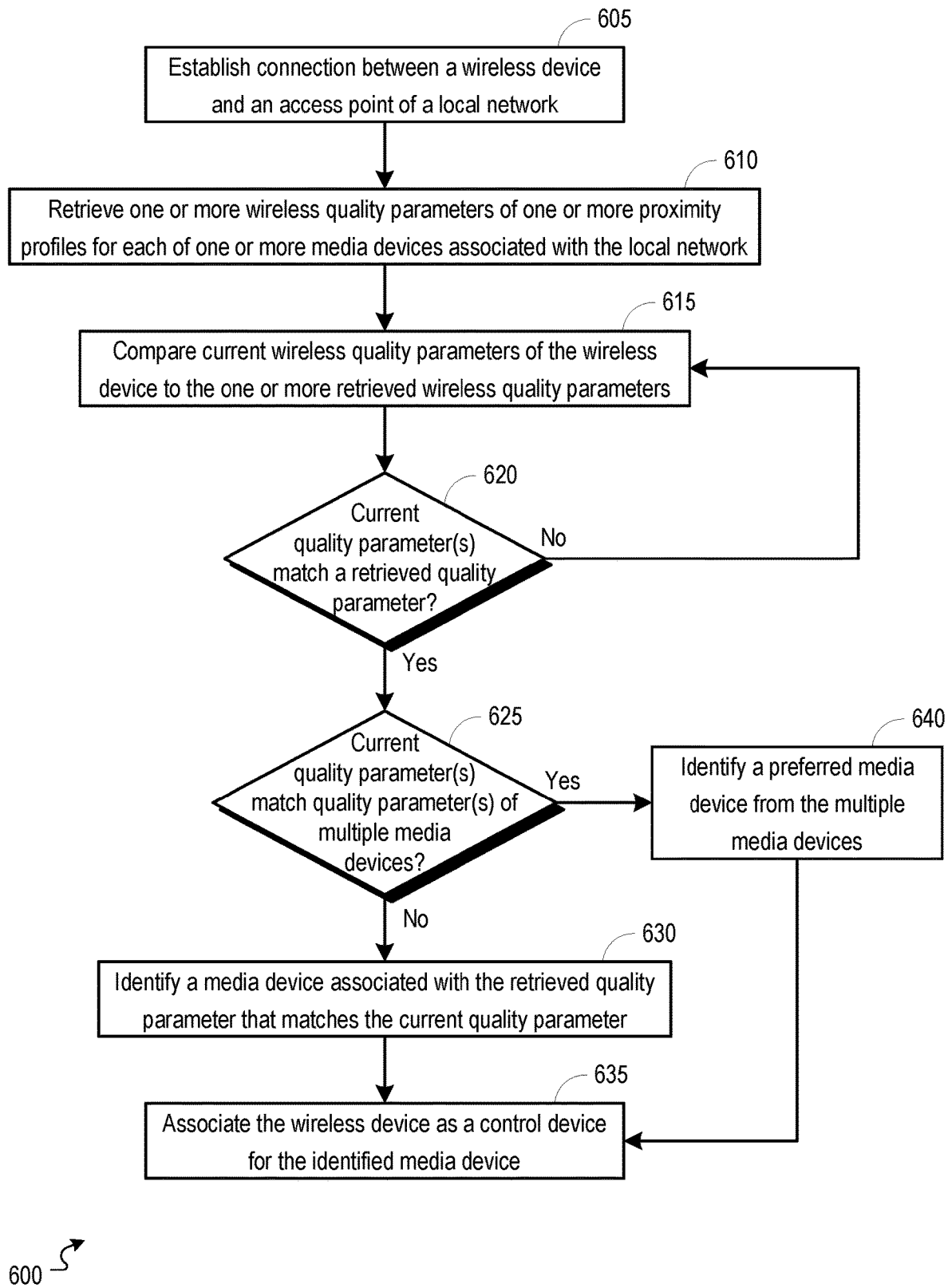
FIG. 6 is a flowchart illustrating an example process operable to facilitate media device control switching based upon a matching of current wireless quality parameters with those of a proximity profile for a media device.

FIG. 6 is a flowchart illustrating an example process 600 operable to facilitate media device control switching based upon a matching of current wireless quality parameters with those of a proximity profile for a media device. The process 600 may begin at 605, when a connection between a wireless device and an access point (e.g., access point 115 of FIG. 1) of a local network is established. The wireless device (e.g., mobile device 105b of FIG. 1) may associate/pair with an access point through a client interface 205 of FIG. 2. The access point may be configured to communicate with the wireless device as well as one or more other devices (e.g., other wireless devices, client devices 105 of FIG. 1, STB 120 of FIG. 1, etc.). It should be understood that the connection between the wireless device and the access point of the local network may be an initial association/pairing or a subsequent association/pairing and that the connection may be established according to various known communication exchange methods and protocols.

At 610, one or more wireless quality parameters of one or more proximity profiles for each of one or more media devices associated with the local network may be retrieved. For example, the wireless quality parameters of the proximity profile(s) may be retrieved by the wireless device from storage at the wireless device, or may be retrieved by the wireless device from the access point, or may be retrieved from another device associated with the local network. The one or more wireless quality parameters may be parameters that were experienced by a wireless device while the wireless device was within an area identified as an area within which a user may view a display associated with the media device that is associated with the proximity profile made up of the one or more wireless quality parameters. The wireless quality parameters may include, for example, the strength of the signal received at the wireless device from an access point (e.g., RSSI (received signal strength indicator)), a data rate at which communications are received at the wireless device from an access point, and/or other parameters experienced by the wireless device while the wireless device was within the viewable area of an associated media device.

At 615, current wireless quality parameters of the wireless device may be compared to the one or more retrieved wireless quality parameters. For example, the wireless device or the access point to which the wireless device is connected (e.g., the viewable area mapping module 220 of FIG. 2) may determine or retrieve one or more current wireless quality parameters. The current wireless quality parameters may be wireless quality parameters associated with the connection between the wireless device and the access point of the local network. For example, the wireless quality parameters may be retrieved from a hardware abstraction layer (HAL) of a WLAN (Wi-Fi) chip.

At 620, a determination may be made whether the current wireless quality parameter(s) match one or more of the retrieved quality parameters of a proximity profile for a media device. The determination whether the current wireless quality parameter(s) match one or more of the retrieved quality parameters may be made, for example, by the wireless device or by the access point of the local network (e.g., the viewable area mapping module 220 of FIG. 2). In embodiments, the viewable area mapping module 220 may determine that the current wireless quality parameter(s) match one or more of the retrieved quality parameters if the current wireless quality parameter(s) is/are within a certain threshold range of one or more of the retrieved quality parameters. If the determination is made that the current wireless quality parameter(s) do not match one or more of the retrieved wireless quality parameters of a proximity profile for a media device, the process 600 may return to 615 where current wireless quality parameters of the wireless device may be retrieved and compared to the one or more retrieved wireless quality parameters. It should be understood that following a determination that the current wireless quality parameter(s) do not match one or more of the retrieved wireless quality parameters of a proximity profile for a media device, the wireless device and/or access point of the local network may be configured to delay a subsequent retrieval of current wireless quality parameters for a predetermined duration of time.

If, at 620, the determination is made that the current wireless quality parameter(s) match one or more of the retrieved wireless quality parameters of a proximity profile for at least one media device, the process 600 may proceed to 625. At 625, a determination may be made whether the current wireless quality parameter(s) match one or more of the retrieved quality parameters of a proximity profile for more than one media device. The determination whether the current wireless quality parameter(s) match one or more of the retrieved quality parameters of a proximity profile for more than one media device may be made, for example, by the wireless device or by the access point of the local network (e.g., the viewable area mapping module 220 of FIG. 2).

If, at 625, the determination is made that the current wireless quality parameter(s) do not match one or more of the retrieved quality parameters of a proximity profile for more than one media device, the process 600 may proceed to 630. At 630, a media device associated with the retrieved quality parameter(s) that match the current quality parameter(s) may be identified. In embodiments, the wireless device or the access point of the local network may identify the media device that is associated with the proximity profile that includes the matching quality parameter(s).

At 635, the wireless device may be associated as a control device for the identified media device. In embodiments, the wireless device may recognize the identified media device as a controlled device, and the identified media device may recognize the wireless device as a controlling device. For example, an exchange of communications (e.g., handshake communications) may be passed between the wireless device and the identified media device, wherein the communications establish the wireless device as a control device for the identified media device. With the wireless device established as a control device for the identified media device, the identified media device may respond to the occurrence of various events occurring at the wireless device and/or may provide various services to the wireless device.

Returning to 625, if the determination is made that the current wireless quality parameter(s) match one or more of the retrieved quality parameters of a proximity profile for more than one media device, the process 600 may proceed to 640. At 640, a preferred media device may be identified from the multiple media devices having quality parameter(s) that match the current quality parameter(s) of the wireless device. In embodiments, the preferred media device may be identified by the wireless device or the access point of the local network. The selection of a preferred media device may be based upon a default setting at the wireless device or the access point (e.g., user may designate device priorities/preferences), history/pattern of use (e.g., the preferred media device may be the last media device that was selected for controlling by the wireless device), or other factor or parameter. In embodiments, the identified preferred media device may be the media device that is associated with a proximity profile having one or more wireless quality parameters that most nearly matches the current wireless quality parameters relative to the wireless quality parameters of the other proximity profiles. After the preferred media device is identified, the wireless device may be associated as a control device for the preferred media device at 635.

Figure 7:
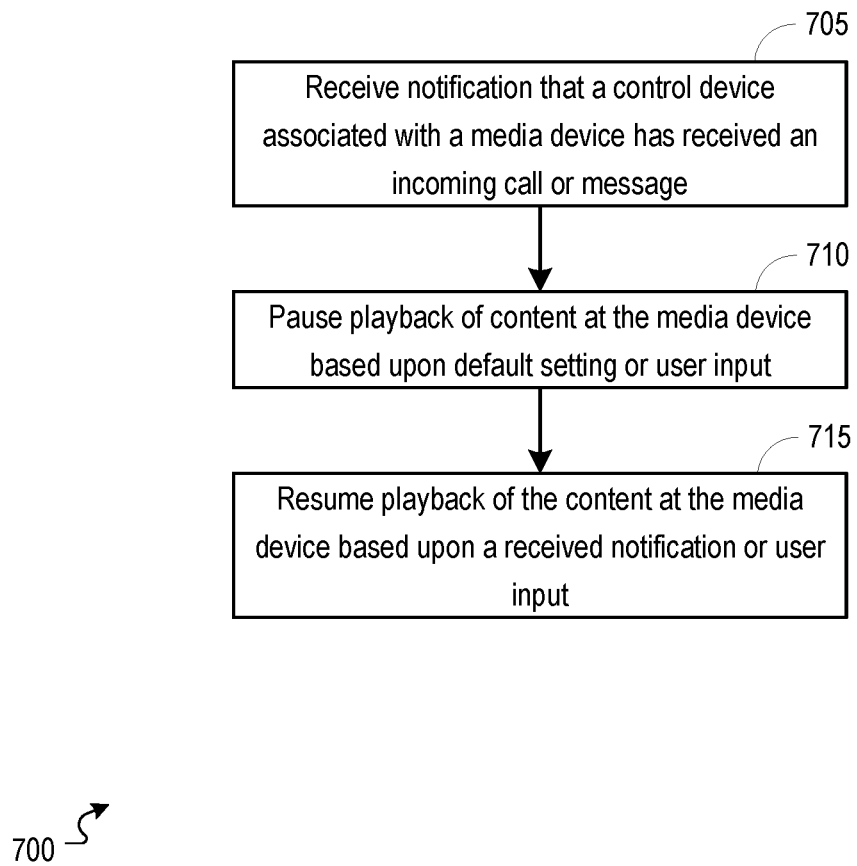
FIG. 7 is a flowchart illustrating an example process operable to facilitate the manipulation of content playback at a media device based upon the reception of a communication at an associated control device.

FIG. 7 is a flowchart illustrating an example process 700 operable to facilitate the manipulation of content playback at a media device based upon the reception of a communication at an associated control device. The process 700 may begin at 705, when a notification is received, the notification informing a media device that a control device associated with the media device has received an incoming call or message. In embodiments, the control device may be a wireless device that has been associated with the media device as a control device based upon a determination that one or more wireless quality parameters of the wireless device indicates that the wireless device is within a viewable area associated with the media device. When a wireless device (e.g., mobile device 105*b* of FIG. 1) receives an incoming call or message while the wireless device is associated with a media device as a control device, the wireless device may notify the media device of the incoming call or message. For example, a gateway or STB device 120 of FIG. 1 with an embedded access point may receive the notification directly from the wireless device, or a gateway or STB device 120 may receive the notification from an access point (e.g., access point 115 of FIG. 1) to which the STB device 120 is connected.

At 710, playback of content may be paused at the media device based upon a default setting or user input. In embodiments, the media device may be configured to automatically (e.g., without receiving a command from a user) pause playback of content when the media device is notified of an incoming call or message at the control device. In embodiments, the media device may output a user interface at a display when the media device is notified of an incoming call or message at the control device, wherein the user interface includes a prompt requesting a confirmation or denial by a user of the suggested action to pause playback of content at the media device. In response to the user confirmation or denial, the media device may pause playback of content or continue playback of content and remove the displayed user interface.

At 715, playback of content may be resumed at the media device based upon a received notification or user input. In embodiments, the media device may receive a notification when the incoming call or message has been terminated or responded to by the control device, and when the notification is received, the media device may automatically (e.g., without receiving a command from a user) resume playback of the paused content. In embodiments, the media device may output a user interface that prompts a user to acknowledge when the incoming call or message has been terminated or responded to, and when the acknowledgement is received by the user through the user interface, the media player may resume playback of the paused content.

Figure 8:
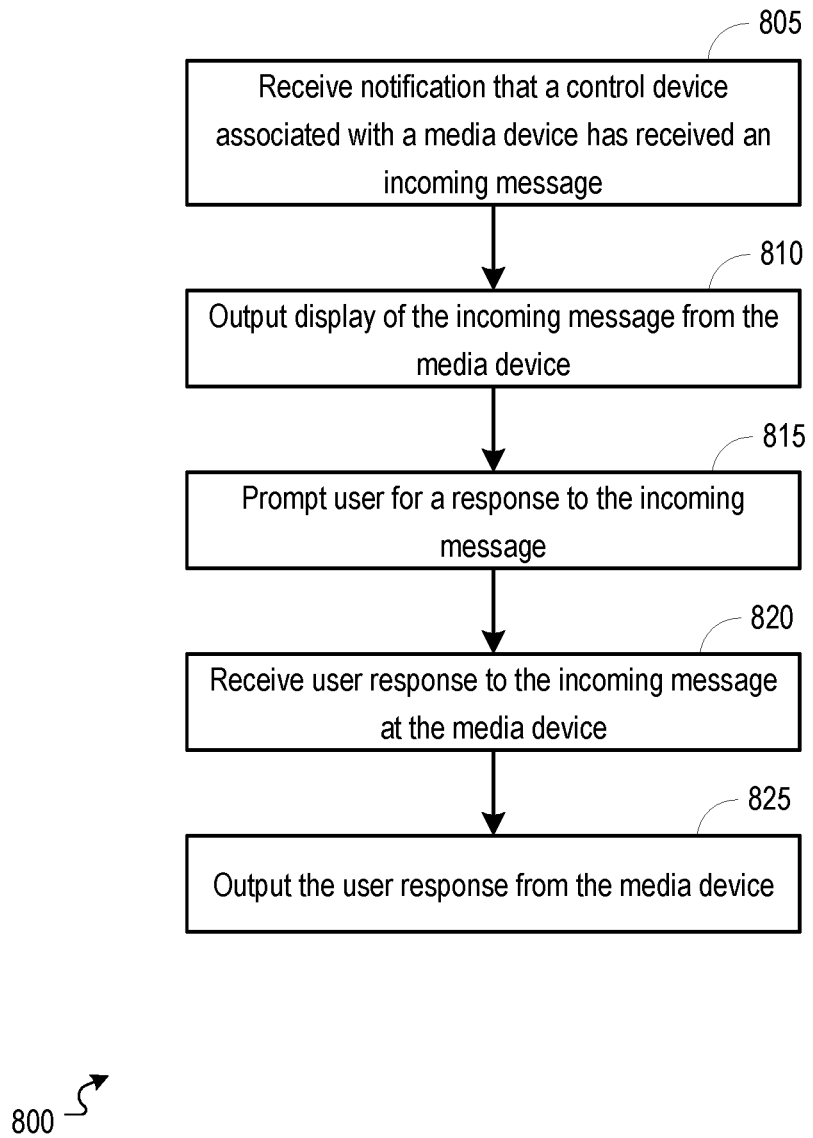
FIG. 8 is a flowchart illustrating an example process operable to facilitate the output from a media device of a notification of an incoming message received at a control device.

FIG. 8 is a flowchart illustrating an example process 800 operable to facilitate the output from a media device of a notification of an incoming message received at a control device. The process 800 may begin at 805, when a notification is received, the notification informing a media device that a control device associated with the media device has received an incoming message. In embodiments, the control device may be a wireless device that has been associated with the media device as a control device based upon a determination that one or more wireless quality parameters of the wireless device indicates that the wireless device is within a viewable area associated with the media device. When a wireless device (e.g., mobile device 105*b* of FIG. 1) receives an incoming message while the wireless device is associated with a media device as a control device, the wireless device, or an associated access point, may notify the media device of the incoming message. For example, a gateway or STB device 120 of FIG. 1 with an embedded access point may receive the notification directly from the wireless device, or a gateway or STB device 120 may receive the notification from an access point (e.g., access point 115 of FIG. 1) to which the gateway or STB device 120 is connected.

At 810, a display of the incoming message may be output from the media device. In embodiments, the media device (e.g., a gateway or STB device 120) may receive the contents of the incoming message, may generate a user interface including the contents of the incoming message (e.g., the text or audio carried by the message), and may output the user interface including the contents of the message to be presented at a display. For example, text of the incoming message may be presented to a user through a display device associated with the media device and/or audio of the incoming message may be output through one or more speakers associated with the media device.

At 815, the media device may output a message prompting a user for a response to the incoming message. In embodiments, the media device may generate and output a user interface that includes a request for the user to respond to the incoming message, the contents of which were output to a display at 810. The user interface may include a text box within which the user may input a response to the message. For example, the user may input text into the text box using a control device (e.g., remote control unit (RCU)) associated with the media device.

At 820, the media device may receive the user response to the incoming message, and the media device may output the user response at 825. In embodiments, the media device may output the response to a target recipient (e.g., sender of the incoming message) or may output the response to the control device, and the control device may output the response to the target recipient. For example, the media device may output the response to the target recipient through an upstream network or may output the response to the control device as a wireless communication.

Figure 9:
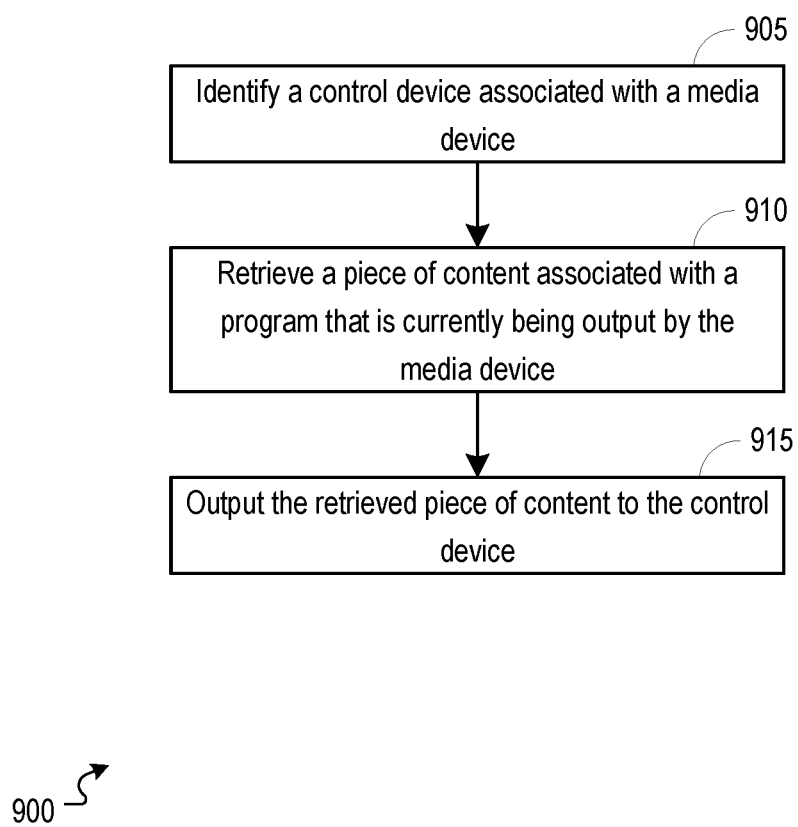
FIG. 9 is a flowchart illustrating an example process operable to facilitate the output of content to a control device associated with a media device, the content being associated with content that is being output by the media device.

FIG. 9 is a flowchart illustrating an example process 900 operable to facilitate the output of content to a control device associated with a media device, the content being associated with content that is being output by the media device. The process 900 may begin at 905, when a control device associated with a media device is identified. In embodiments, the control device may be a wireless device (e.g., mobile device 105 of FIG. 1) that has been associated with the media device (e.g., gateway or STB device 120 of FIG. 1) as a control device based upon a determination that one or more wireless quality parameters of the wireless device indicates that the wireless device is within a viewable area associated with the media device. The media device may be informed by the control device or by an embedded or external access point when the control device has been associated with the media device.

At 910, a piece of content associated with a program that is currently being output by the media device may be retrieved. In embodiments, the media device may retrieve a piece of content such as an advertisement (e.g., video/audio clip, banner, etc.), instructional, cooperative, or other content that is associated with the program currently being output to a display by the media device. For example, the piece of content may be received at the media device along with the program that is being output from the media device, may be pre-loaded on the media device, or may be retrieved by the media device from an external server (e.g., content server in an upstream network).

At 915, the retrieved piece of content may be output to the control device. In embodiments, the piece of content may be output from the media device to the control device as one or more wireless communications, or the piece of content may be output from an access point (e.g., access point 115 of FIG. 1) associated with the media device to the control device. The piece of content may be output as audio/video clip, a banner, or other piece of content for display at the control device.

Figure 10:
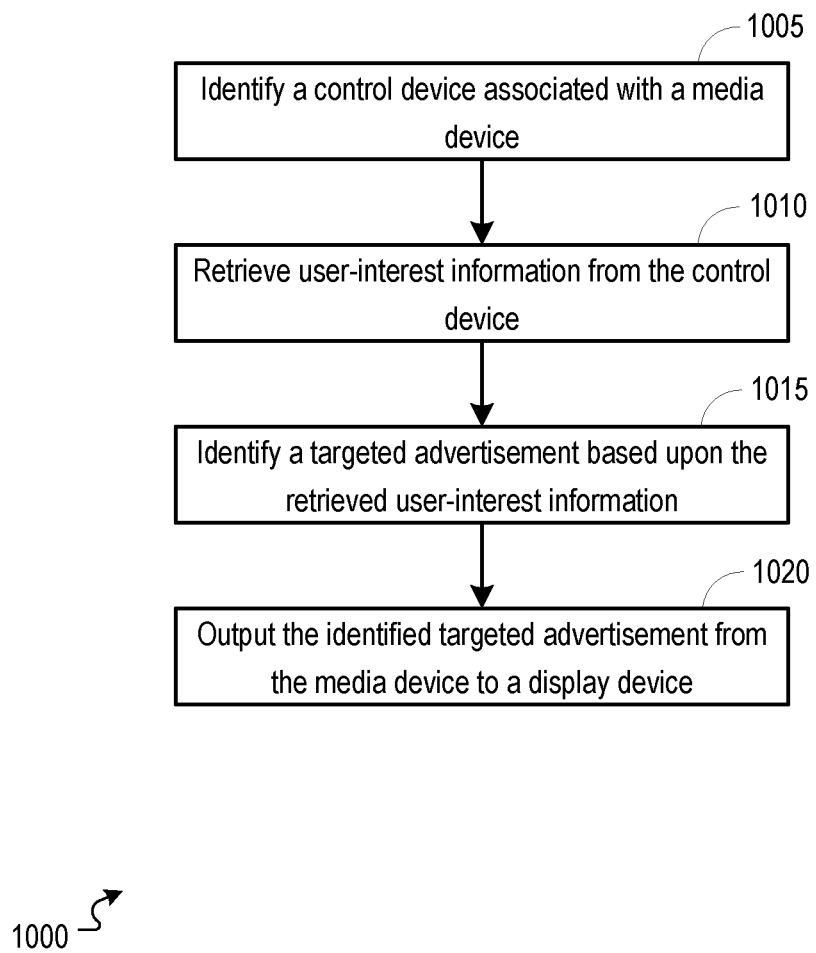
FIG. 10 is a flowchart illustrating an example process operable to facilitate the output of targeted advertisements based upon user information retrieved from a control device.

FIG. 10 is a flowchart illustrating an example process 1000 operable to facilitate the output of targeted advertisements based upon user information retrieved from a control device. The process 1000 may begin at 1005, when a control device associated with a media device is identified. In embodiments, the control device may be a wireless device (e.g., mobile device 105 of FIG. 1) that has been associated with the media device (e.g., gateway or STB device 120 of FIG. 1) as a control device based upon a determination that one or more wireless quality parameters of the wireless device indicates that the wireless device is within a viewable area associated with the media device. The media device may be informed by the control device or by an embedded or external access point when the control device has been associated with the media device.

At 1010, user-interest information may be retrieved from the control device. In embodiments, the media device may request and receive a communication from the control device, the communication carrying user-interest information stored at the control device. For example, the user-interest information may include an identification of the user, personal information associated with the user (e.g., name, gender, age, etc.), preferences associated with the user (e.g., favorite channels, shows, media genres, etc.), device usage history (e.g., content previously viewed at the control device), and/or other information that may be used to select appropriate targeted advertisement content that might be relevant to the user.

At 1015, a targeted advertisement may be identified based upon the retrieved user-interest information. In embodiments, the media device may identify a targeted advertisement that is associated with one or more parameters included within the user-interest information, or the media device may forward the user-interest information to an external server (e.g., targeted advertisement server within an upstream network), and the targeted advertisement may be selected by the external server. For example, the targeted advertisement may be identified based upon a determination that a parameter associated with the targeted advertisement matches a parameter that is included within the user-interest information.

At 1020, the identified targeted advertisement may be output from the media device to a display device. In embodiments, the targeted advertisement may be inserted into a program that is being output from the media device to an associated display device. The targeted advertisement may be inserted, at an upstream server or network element, into a stream carrying the program to the media device, or the media device may output the targeted advertisement during a predetermined point of the program being output from the media device.

Figure 11:
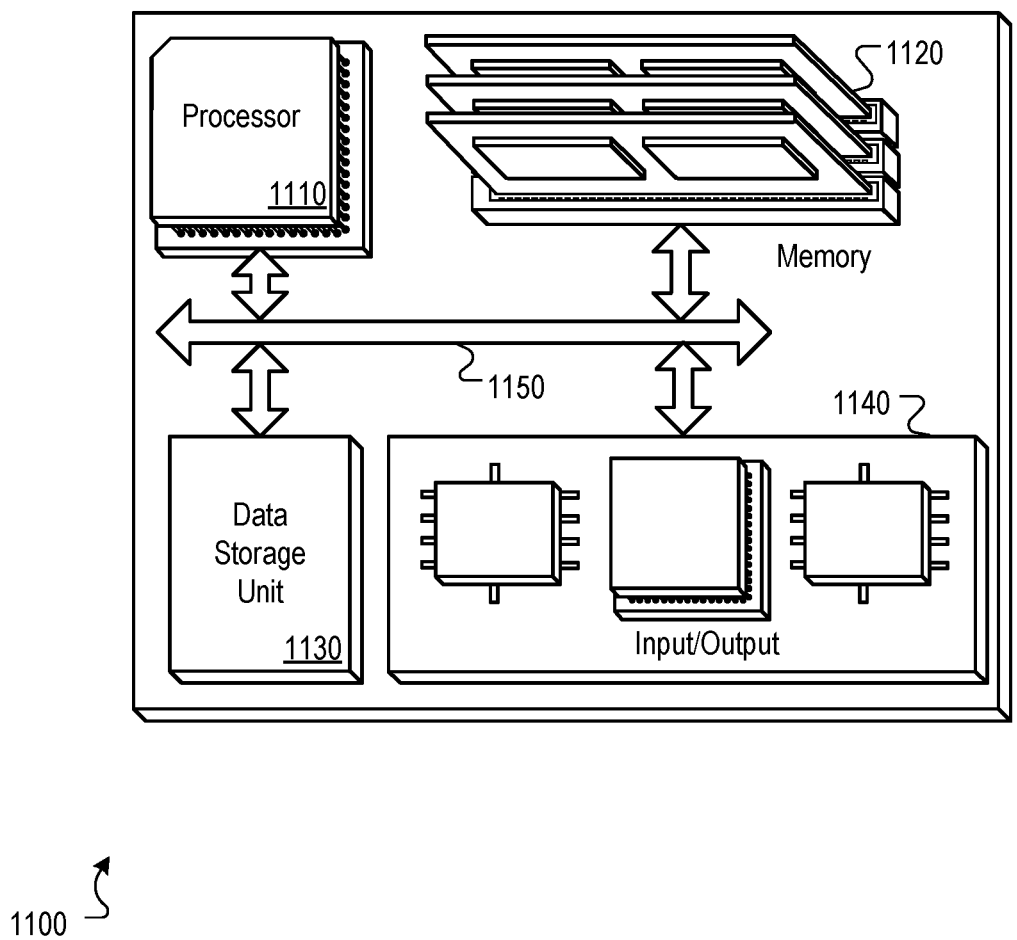
FIG. 11 is a block diagram of a hardware configuration operable to facilitate the control of a media device based upon the proximity of a wireless device.

FIG. 11 is a block diagram of a hardware configuration 1100 operable to facilitate the control of a media device based upon the proximity of a wireless device. The hardware configuration 1100 can include a processor 1110, a memory 1120, a storage device 1130, and an input/output device 1140. Each of the components 1110, 1120, 1130, and 1140 can, for example, be interconnected using a system bus 1150. The processor 1110 can be capable of processing instructions for execution within the hardware configuration 1100. In one implementation, the processor 1110 can be a single-threaded processor. In another implementation, the processor 1110 can be a multi-threaded processor. The processor 1110 can be capable of processing instructions stored in the memory 1120 or on the storage device 1130.

The memory 1120 can store information within the hardware configuration 1100. In one implementation, the memory 1120 can be a computer-readable medium. In one implementation, the memory 1120 can be a volatile memory unit. In another implementation, the memory 1120 can be a non-volatile memory unit.

In some implementations, the storage device 1130 can be capable of providing mass storage for the hardware configuration 1100. In one implementation, the storage device 1130 can be a computer-readable medium. In various different implementations, the storage device 1130 can, for example, include a hard disk device, an optical disk device, flash memory or some other large capacity storage device. In other implementations, the storage device 1130 can be a device external to the hardware configuration 1100.

The input/output device 1140 provides input/output operations for the hardware configuration 1100. In one implementation, the input/output device 1140 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a CPE device (e.g., access point 115 of FIG. 1, gateway or STB 120 of FIG. 1, etc.) or a client device (e.g., television 105a of FIG. 1, mobile device 105b, etc.). In embodiments, the input/output device can include driver devices configured to send communications to, and receive communications from one or more networks (e.g., subscriber network 130 of FIG. 1, WAN 125 of FIG. 1, local network, etc.).

Those skilled in the art will appreciate that the invention improves upon methods and systems for identifying a media device to be controlled by a wireless device. Methods, systems, and computer readable media can be operable to facilitate the control of a media device based upon the proximity of a wireless device. A viewable area may be mapped for one or more media devices within a premise, wherein the map of the viewable area for a media device includes one or more wireless quality parameters observed by a wireless device while the wireless device is located within an area around the media device from which a user may view content output from the media device. Based upon a comparison between wireless quality parameters currently observed by a wireless device and wireless quality parameters of a viewable area map, a determination may be made that the wireless device is within the viewable area of a media device, and the wireless device may be configured as a control device for the media device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   establishing a connection between a wireless device and an access point;
   retrieving one or more proximity profiles for each media device of one or more media devices, wherein the one or more proximity profiles for each respective one media device of the one or more media devices comprises one or more expected wireless quality parameters associated with a connection between the access point and a device that is within an area around the respective one media device from which content output by the media device may be viewed at a display associated with the respective one media device;
   retrieving one or more wireless quality parameters associated with the connection between the wireless device and the access point;
   determining a media device of the one or more media devices, the determined media device having a viewing area within which the wireless device is determined to be based upon an identification of at least one wireless quality parameter of a proximity profile for the determined media device, wherein the identified at least one wireless quality parameter matches at least one of the wireless quality parameters associated with the connection between the wireless device and the access point; and
   configuring the determined media device to recognize the wireless device as a control device;
   receiving a notification at the determined media device, the notification informing the determined media device that an incoming call has been received by the wireless device, wherein the notification is received by the determined media device from the access point;
   in response to the notification received from the access point, pausing playback of content at the determined media device; and
   resuming playback of the content at the determined media device in response to receiving a notification that the incoming call has terminated at the wireless device.

2. The method of claim 1, further comprising:
   receiving a notification at the media device for which the wireless device is configured as a control device, the notification including a message received by the wireless device;
   generating a user interface that includes the message and a prompt for user input of a response to the message;
   outputting the user interface to a display;
   receiving user input of a response to the message; and
   outputting the response to a designated target.

3. The method of claim 1, further comprising:
   retrieving, at the media device for which the wireless device is configured as a control device, a piece of content that is associated with a program being output by the media device to a display; and
   outputting the retrieved piece of content to the wireless device.

4. The method of claim 1, further comprising:
   retrieving, at the media device for which the wireless device is configured as a control device, user-interest information from the wireless device;
   identifying a targeted advertisement that is associated with the retrieved user-information; and
   outputting the targeted advertisement to a display by inserting the targeted advertisement into a program that is being output to the display.

5. The method of claim 1, wherein the one or more proximity profiles are retrieved from storage at the wireless device.

6. The method of claim 1, wherein the one or more proximity profiles are retrieved from storage at the access point.

7. The method of claim 1, wherein the proximity profile for each respective one media device of the one or more media devices is generated by taking a plurality of wireless quality measurements associated with the wireless connection between a wireless device and an access point while the wireless device is within an area around the respective one media device from which content output by the media device may be viewed at a display associated with the respective one media device.

8. An apparatus comprising:
   one or more modules comprising at least a memory and processor that are configured to:
   when a connection between a wireless device and an access point is established, retrieve one or more proximity profiles for each media device of one or more media devices, wherein the one or more proximity profiles for each respective one media device of the one or more media devices comprises one or more expected wireless quality parameters associated with a connection between the access point and a device that is within an area around the respective one media device from which content output by the media device may be viewed at a display associated with the respective one media device;
   retrieve one or more wireless quality parameters associated with the connection between the wireless device and the access point;
   determine a media device of the one or more media devices, the determined media device having a viewing area within which the wireless device is determined to be based upon an identification of at least one wireless quality parameter of a proximity profile for the determined media device, wherein the at least one wireless quality parameter of the proximity profile matches at least one of the wireless quality parameters associated with the connection between the wireless device and the access point; and configure the determined media device to recognize the wireless device as a control device;

receive a notification at the determined media device, the notification informing the determined media device that an incoming call has been received by the wireless device, wherein the notification is received by the determined media device from the access point;

in response to the notification received from the access point, pause playback of content at the determined media device; and resume playback of the content at the determined media device in response to receiving a notification that the incoming call has terminated at the wireless device.

9. The apparatus of claim 8, wherein the one or more modules are further configured to:

receive a notification that includes a message that has been received by the wireless device;

generate a user interface that includes the message and a prompt for user input of a response to the message;

output the user interface to a display;

receive user input of a response to the message; and output the response.

10. The apparatus of claim 8, wherein the one or more modules are further configured to:

retrieve a piece of content that is associated with a program being output to a display; and output the retrieved piece of content to the wireless device.

11. The apparatus of claim 8, wherein the one or more modules are further configured to:

retrieve user-interest information from the wireless device;

identify a targeted advertisement that is associated with the retrieved user-information; and output the targeted advertisement to a display by inserting the targeted advertisement into a program that is being output to the display.

12. One or more non-transitory computer readable media having instructions operable to cause one or more processors to perform the operations comprising:

establishing a connection between a wireless device and an access point;

retrieving one or more proximity profiles for each media device of one or more media devices, wherein the one or more proximity profiles for each respective one media device of the one or more media devices comprises one or more expected wireless quality parameters associated with a connection between the access point and a device that is within an area around the respective one media device from which content output by the media device may be viewed at a display associated with the respective one media device;

retrieving one or more wireless quality parameters associated with the connection between the wireless device and the access point;

determining a media device of the one or more media devices, the determined media device having a viewing area within which the wireless device is determined to be based upon an identification of at least one wireless quality parameter of a proximity profile for the media device, wherein the at least one wireless quality parameter of the proximity profile matches at least one of the wireless quality parameters associated with the connection between the wireless device and the access point; and configuring the determined media device to recognize the wireless device as a control device;

receiving a notification at the determined media device, the notification informing the determined media device that an incoming call has been received by the wireless device, wherein the notification is received by the determined media device from the access point;

in response to the notification received from the access point, pausing playback of content at the determined media device; and resuming playback of the content at the determined media device in response to receiving a notification that the incoming call has terminated at the wireless device.

13. The one or more non-transitory computer-readable media of claim 12, wherein the instructions are further operable to cause one or more processors to perform the operations comprising:

receiving a notification at the media device for which the wireless device is configured as a control device, the notification including a message received by the wireless device;

generating a user interface that includes the message and a prompt for user input of a response to the message;

outputting the user interface to a display;

receiving user input of a response to the message; and outputting the response to a designated target.

14. The one or more non-transitory computer-readable media of claim 12, wherein the instructions are further operable to cause one or more processors to perform the operations comprising:

retrieving, at the media device for which the wireless device is configured as a control device, a piece of content that is associated with a program being output by the media device to a display; and outputting the retrieved piece of content to the wireless device.

15. The one or more non-transitory computer-readable media of claim 12, wherein the instructions are further operable to cause one or more processors to perform the operations comprising:

retrieving, at the media device for which the wireless device is configured as a control device, user-interest information from the wireless device;

identifying a targeted advertisement that is associated with the retrieved user-information; and outputting the targeted advertisement to a display by inserting the targeted advertisement into a program that is being output to the display.

16. The one or more non-transitory computer-readable media of claim 12, wherein the one or more proximity profiles are retrieved from storage at the wireless device.

17. The one or more non-transitory computer-readable media of claim 12, wherein the one or more proximity profiles are retrieved from storage at the access point.

* * * * *